Figure 1:
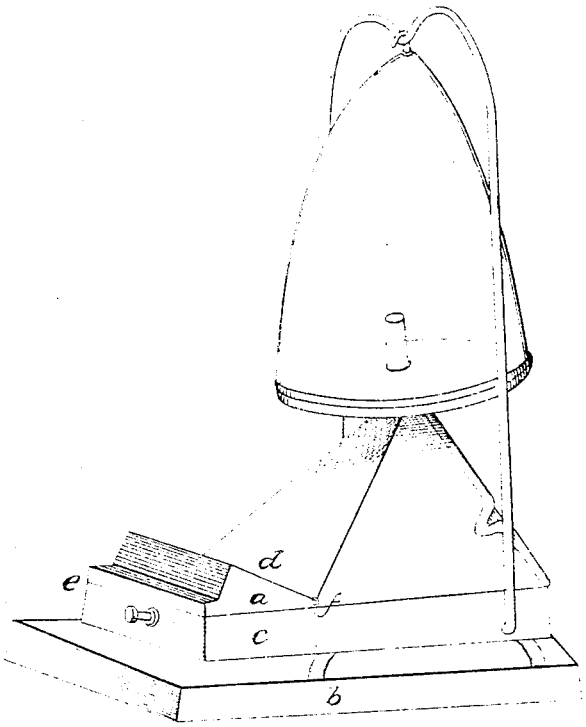
Figure 2:
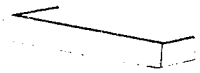

BEST AVAILABLE COPY

No. 223. 1859.

Witnesses:
Wm. L. Avery
J. B. Smith

Inventor:
Wm. Riley

NATIONAL PHOTOLITHOGRAPHER WASHINGTON D.C.